No. 738,241. PATENTED SEPT. 8, 1903.
W. S. ROGERS.
MOTOR VEHICLE.
APPLICATION FILED JAN. 24, 1902.
NO MODEL.

Witnesses.
C. F. Wesson.
M. E. Regan.

Inventor:
W. S. Rogers.
By
Southgate & Southgate
Attorneys.

No. 738,241. Patented September 8, 1903.

UNITED STATES PATENT OFFICE.

WINFIELD S. ROGERS, OF KEENE, NEW HAMPSHIRE.

MOTOR-VEHICLE.

SPECIFICATION forming part of Letters Patent No. 738,241, dated September 8, 1903.

Application filed January 24, 1902. Serial No. 91,005. (No model.)

*To all whom it may concern:*

Be it known that I, WINFIELD S. ROGERS, a citizen of the United States, residing at Keene, in the county of Cheshire and State of New Hampshire, have invented a new and useful Motor-Vehicle, of which the following is a specification.

This invention relates to a motor-carriage which is designed for carrying a number of passengers.

The especial object of this invention is to provide a strong, compact, and efficient form of motor-carriage having a seating capacity for carrying a number of passengers and which is adapted to be driven by substantially the same arrangement of operating mechanism as employed in an ordinary steam-propelled carriage.

To these ends this invention consists of the motor-carriage and of the combinations of parts therein, as hereinafter described, and more particularly pointed out in the claims at the end of this specification.

Figure 1:
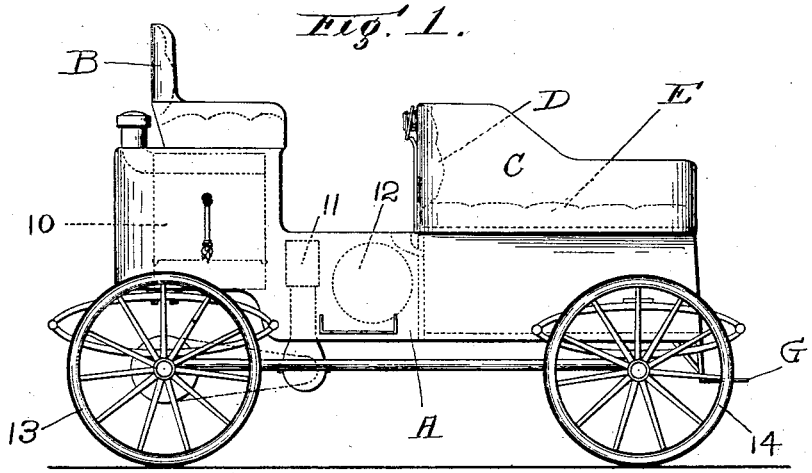
Figure 2:
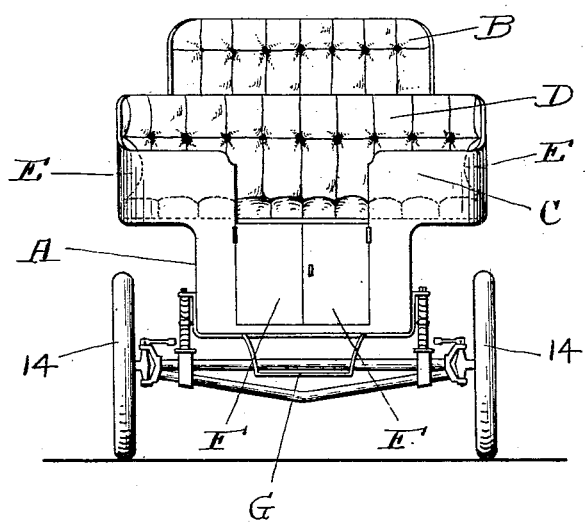

In the accompanying drawings, Figure 1 is a side view of a motor-carriage constructed according to this invention, and Fig. 2 is a front view of the same.

For use as a transfer-coach or for carrying passengers a steam-propelled vehicle has a number of advantages over either the ordinary passenger-coach or the electric cabs of ordinary pattern—that is to say, a steam-propelled vehicle under present conditions is usually more reliable than a vehicle propelled by electricity, as water or fuel for a steam-vehicle can be obtained in almost all locations, while the battery of an electric vehicle can only be recharged in comparatively few locations, while a steam-vehicle can be run for longer distances and at higher speeds than an ordinary passenger-coach.

Steam-carriages are now quite generally employed for private conveyances, but have not as yet come into general use for carrying passengers, because the standard steam-vehicles have not heretofore had sufficient seating capacity.

The especial object of my present invention is therefore to provide a motor-carriage in which the operating apparatus is arranged to be readily controlled from a driver's seat at the rear of the machine and which is provided with an increased seating capacity, and although my invention has been designed for use on steam-propelled carriages it is to be understood that the same is also applicable to carriages driven by gasolene, electricity, or other motive power. Further, while a motor-carriage constructed according to my invention has been especially designed for carrying passengers it is to be understood that the compartment at the front of the vehicle, which I have herein termed the "passenger-compartment," may, if desired, be utilized for carrying freight rather than for seating passengers.

To these ends a motor-carriage constructed according to this invention comprises a body portion with a driver's seat at the rear end thereof and a passenger-compartment at the front end, having one forwardly-facing seat and two inwardly-facing side seats.

The operating apparatus is arranged in the rear part of the body portion substantially in the same manner as in an ordinary steam-propelled carriage. The driver's seat occupies an elevated position, the foot room for said driver's seat being above the body portion. The passengers' compartment occupies a lower position, and the front part of the body portion furnishes the foot room for the passengers' seats—that is to say, a motor-carriage constructed according to my present invention consists, essentially, of an operating apparatus located in the body portion and having a driver's seat above the same substantially as in an ordinary steam-propelled carriage and having the body portion extended forward to support a passenger-compartment and furnish foot room for the passengers' seats. By means of this construction I have provided a form of motor-vehicle which may be readily operated by persons accustomed to controlling ordinary steam-propelled carriages, as the operating apparatus is arranged in substantially the same position with respect to the driver's seat as in an ordinary steam-carriage, but which at the same time will have sufficient seating capacity to adapt the carriage for use as a public vehicle.

Referring to the accompanying drawings and in detail, a motor-carriage constructed according to my invention as herein illustrated comprises a body portion A. Mounted in the body portion A at the rear end thereof substantially in the same manner as in an ordinary steam-propelled carriage is a boiler 10, an engine 11, and a fuel-tank 12. The body portion A is mounted upon rear wheels 13 and front wheels 14, the rear wheels 13 being driven from the engine by sprocket-wheels and chain in the ordinary manner. Carried by the body portion above the boiler 10 is a driver's seat B, the foot room for said driver's seat being above the body A.

At the front end of the carriage-body A is a passenger-compartment C, which extends out over the front wheels 14 and is provided with a forwardly-facing seat D and inwardly-facing side seats E. The passenger-compartment is at a lower elevation than the driver's seat B, and the foot room for the seats of the passenger-compartment is provided in the front end of the body portion. The passenger-compartment C, if desired, may be closed at its front by doors F, and access to said compartment may be had by a step G.

Changes may be made in practicing my invention by skilled motor-carriage builders without departing from the scope thereof as expressed in the claims. I do not wish, therefore, to be limited to the construction I have herein shown and described; but What I do claim, and desire to secure by Letters Patent of the United States, is—

1. In a motor-vehicle, the combination of front and rear wheels, a vehicle-body setting down between said wheels, a driver's seat at the rear of the body, and a passenger-compartment at the forward end of the vehicle of greater width than the body portion, and carried thereby so as to extend out over the front wheels.

2. In a motor-vehicle, the combination of front and rear wheels, a vehicle-body setting down between said wheels, an elevated driver's seat at the rear of the body having foot room above the body, and a passenger-compartment at the forward end of the vehicle of greater width than the body and extending over the front wheels, the foot room for said compartment being within the body.

3. In a motor-vehicle, the combination of front and rear wheels, a vehicle-body setting down between said wheels, an elevated driver's seat at the rear of the body, and a front-opening passenger-compartment of greater width than the body and extending out over the front wheels, said passenger-compartment having a forwardly-facing seat and inwardly-facing side seats.

In testimony whereof I have hereunto set my hand in the presence of two subscribing witnesses.

WINFIELD S. ROGERS.

Witnesses:
M. L. WOODWARD,
J. H. WASHBURN.